Sept. 13, 1927.
W. J. McLAUGHLIN
OVERRUN TESTER
Filed June 9, 1924
1,642,212
2 Sheets-Sheet 1
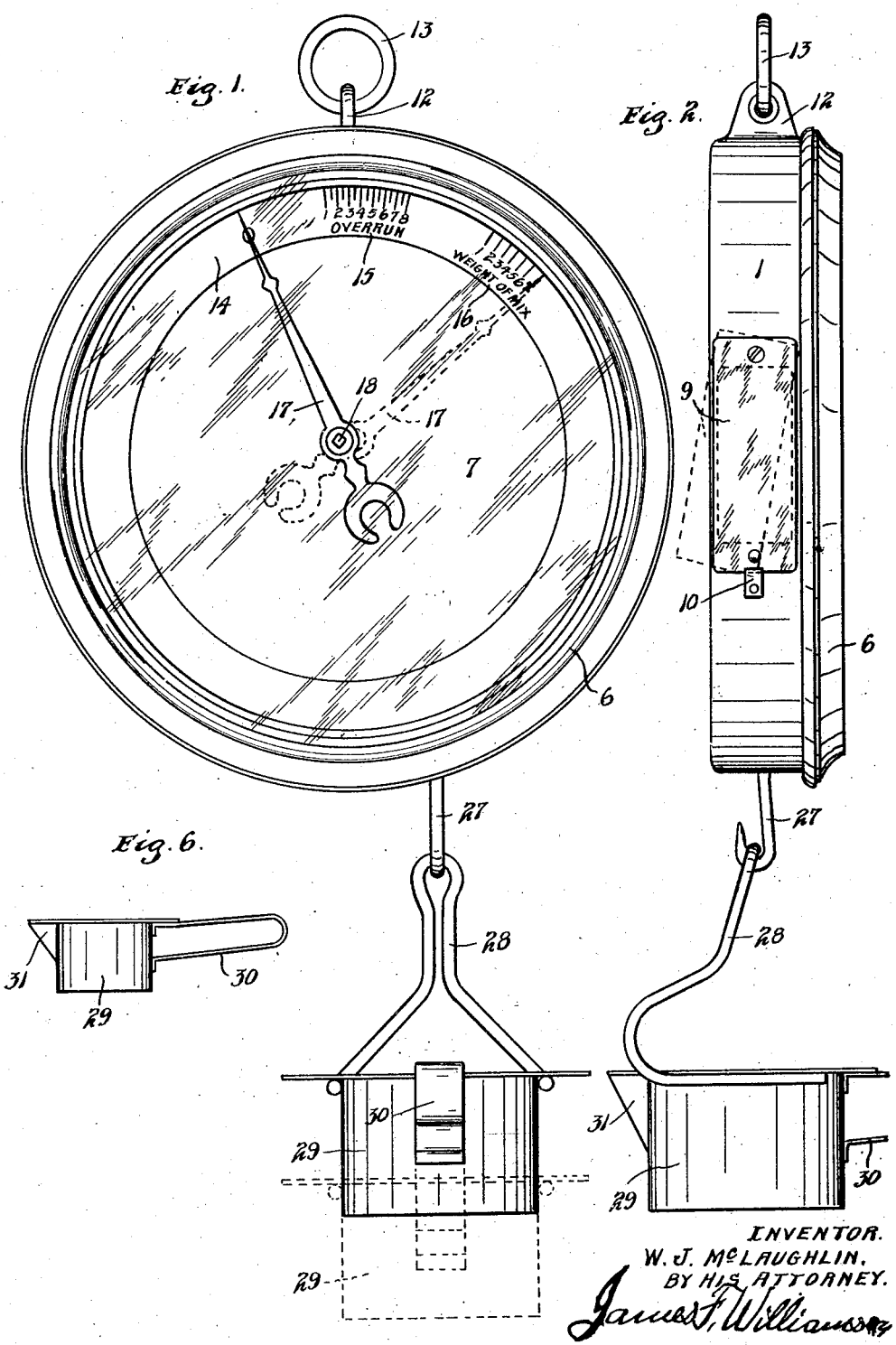
INVENTOR.
W. J. McLAUGHLIN,
BY HIS ATTORNEY.

Sept. 13, 1927. 1,642,212
W. J. McLAUGHLIN
OVERRUN TESTER
Filed June 9, 1924   2 Sheets-Sheet 2
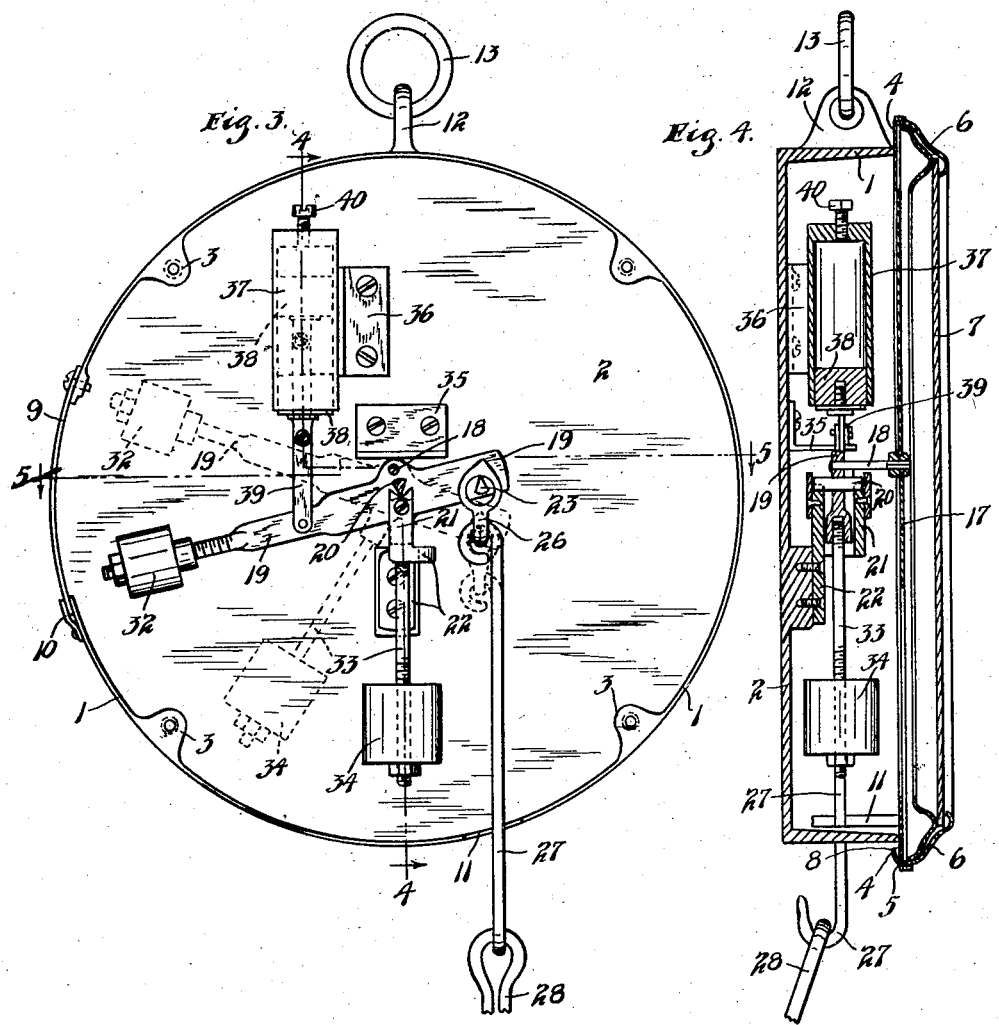
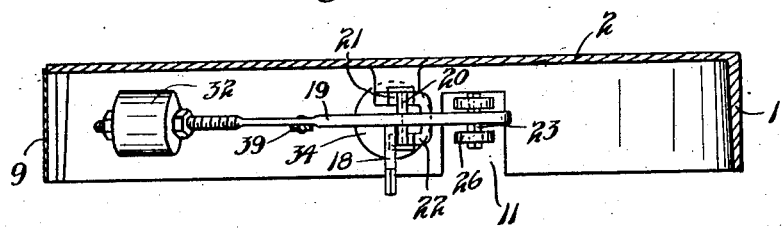
INVENTOR.
W. J. McLAUGHLIN.
BY HIS ATTORNEY.

Patented Sept. 13, 1927.

1,642,212

UNITED STATES PATENT OFFICE.

WILLIAM J. McLAUGHLIN, OF OWATONNA, MINNESOTA.

OVERRUN TESTER.

Application filed June 9, 1924. Serial No. 718,704.

This invention relates to a testing device and particularly to a device known as an overrun testing machine, one use of which machine is common in the manufacture of ice cream and similar frozen substances. When the ice cream is frozen it is desirable to increase the volume to a certain extent, preferably about one hundred percent, and the device of this invention furnishes a simple and efficient means for testing the frozen mixture to determine when the volume has been increased as desired.

It is an object of this invention to provide an overrun tester comprising a dial with circumferentially arranged graduations thereon, said device having a hand or pointer adapted to co-operate with said graduations to indicate the increase in volume of the frozen material.

It is a further object of the invention to provide such a machine comprising a casing having a dial thereon and graduations on the dial, as stated, together with a pointer co-operating with the graduations, which pointer is carried by a swinging weighted member mounted in the casing and which carries a suspension means for a receptacle adapted to hold a fixed volume of material.

It is a further object of the invention to provide such a device as above set forth, together with a retarding means mounted in said casing which is connected to said swinging member.

It is more specifically an object of the invention to provide an overrun tester comprising a casing, a graduated dial carried thereby, a pointer co-operating with the graduations on the dial, which pointer is carried by an oscillating lever mounted for free swinging movement in the casing and carrying a plurality of weighted arms, to one end of which lever a link is attached extending out of said casing and adapted to support a receptacle of fixed volume, said lever having a retarding means attached to its upper side.

These and other objects and advantages of the invention will be fully set forth in the following description made in connection with the accompanying drawings in which like reference characters refer to the same parts throughout the different views, and in which, Fig. 1 is a view in front elevation of the device, parts of the device being shown in dotted lines in different positions;

Fig. 2 is a view in side elevation of the device, a part thereof being shown in different position in dotted lines;

Fig. 3 is a view of the device with the cover and dial of the casing removed, parts thereof being shown in different positions in dotted lines;

Fig. 4 is a view in vertical section of the device taken on the line 4—4 of Fig. 3;

Fig. 5 is a horizontal section of the device taken on the line 5—5 of Fig. 3; and Fig. 6 is a view in side elevation of the receptacle used.

Referring to the drawings, the device comprises a cylindrical casing 1 having a bottom portion 2, the top of said casing being provided with a plurality of inwardly extending spaced lugs 3 provided with tapped holes for the reception of attaching screws (not shown) for the flanged plate 4. The plate 4 has a large central circular opening and is provided with circumferentially spaced slots 5 adjacent its flange which receive spaced lugs 8 projecting from an annular frame 6 which carries the front glass or crystal 7 of the device. The lugs 8 are bent inwardly back of the plate 4 and thus hold the frame 6 and glass 7 firmly but detachably in position on the casing. The casing 1 is provided with an opening at one side thereof which is covered by a laterally swinging plate 9 attached to the casing by a screw at one end and held in closed position by a small lug 10 secured to the side of the casing and engaging the other end of said plate. The casing 1 is also provided with an opening 11 adjacent its bottom portion for a purpose to be later described and also has an apertured lug 12 secured at its top side, which lug receives a suspending ring 13. The member 4 has formed thereon or attached thereto a graduated dial 14 which has the zero mark at one side of its top central position and also has spaced series of graduations 15 and 16. The graduations 15 are numbered from 1 to 8 and comprise dividing lines for the spaces between said numbers and are entitled "Overrun". The graduations 16 are numbered from 1 to 7 and are entitled "Weight of mix". A hand or pointer 17 co-operates with the dial and is pivoted centrally thereof and carried on a pin 18 projecting outwardly from one side of an oscillating lever or poise 19, which poise has sharp edged projections 20 projecting from each side thereof having their edges resting in depressions formed in the tops of posts 21 forming part of and upstanding from a bracket 22 secured by suitable screws to the rear or back 2 of the casing 1. The said lever 19, which is preferably of rectangular shape in cross section also has projecting from each side thereof adjacent one end, the upwardly directed sharp edged members 23 on which is supported a yoke 26 having apertures in its sides extending over the lugs 23. The yoke 26 pivotally supports the upper end of a link 27 depending through the opening 11 in the casing and having a hook at its lower end. A curved bifurcated bracket 28 is supported by the hook on link 27, which bracket is adapted to receive between its lower arms the body of a receptacle 29 having a top outwardly extending flange extending over said arms and supporting the receptacle in said bracket. The receptacle 29 is conveniently provided with a handle portion 30 and a spout 31. The other end of the lever 19 is formed as a projecting threaded arm and has adjustably mounted thereon a weight 32 held in position by a nut threaded on the end of said arm. The lever 19 also has projecting from its lower side at an acute angle to the arm carrying weight 32, another arm or rod 33 which is threaded into a boss on said lever and is threaded at its outer end where it receives a weight 34 adjustable thereon and held in place by a nut theaded on said rod. An angle plate 35 is secured to the rear 2 of the casing 1 and has an outwardly projecting horizontal portion adapted to form a stop for the lever 19 in its extreme position. A bracket 36 is also secured to the back of the casing above the lever 19 and carries a cylindrical dash pot member 37 closed at its upper end and having slidably mounted therein a piston 38. The piston has a stem depending therefrom pivotally connected by links 39 to an intermediate point on lever 19. The dash pot 37 is bored and tapped at its upper end and provided with a set screw 40 loosely fitting therein adapted to form a regulatable vent means.

In operation, the device is suspended from any suitable support by the ring 13. The lever 19 is normally in position with the hand 17 in line with the zero point on the dial, as shown in Figs. 1 and 3. The ice cream mixture, when in liquid and unfrozen condition, is placed in the receptacle 29, said receptacle being entirely filled and the receptacle is then placed in the bracket 28. The receptacle is adapted to hold substantially one pound of a certain mixture and with such a mixture, the weights 32 and 34 should be adjusted so that the hand 17 registers its extreme position one space beyond the graduation marked 7 on the scale 16. Said scale is graduated with seven spaces, each representing two ounces weight. The weight 32 can be adjusted by an implement inserted through the opening in the casing covered by plate 9, said plate being swung aside to give access to said weight. With the device so adjusted, when the mixture is frozen or partially frozen, the receptacle 29 will be filled with such frozen or partially frozen material at intervals and again placed in the bracket 28. When the mixture has been sufficiently frozen to have increased in volume one hundred per cent, the hand will take a position over and register with the graduation marked 8. If the receptacle full of the original ice cream mixture weighs only fourteen ounces the device will be adjusted so that the hand 17 will register with the numeral 7 on the graduations 15. When the frozen or partially frozen material is then tested at intervals the freezing should be continued until the hand 17 registers with the numeral 7 on the graduations 16. The mixture will then have been frozen to comprise twice the volume of the original liquid mixture. The machine can thus be easily adjusted to test various ice cream mixtures. The motion of the lever 19 and the connected parts is regulated by the dash pot 37 and piston 38 so that there is no violent movement or shocks of said parts and of the receptacle 29. The extreme positions of the lever 19 are determined by the stop plate 35.

From the above description it is seen that applicant has provided a very simple form of overrun tester and one which is very efficient. The device has been thoroughly tested in actual practice and found to be very successful and convenient in operation. The parts of the device are few and ruggedly made and there are no springs or other delicately adjusted parts easily to get out of order.

It will, of course, be understood, that various changes may be made in the form, details, arrangement and proportions of the parts without departing from the scope of applicant's invention, which, generally stated, consists in a device capable of carrying out the objects above stated, such as shown and described and set forth in the appended claims.

What is claimed is:

1. An overrun tester adapted to be used for frozen mixtures, comprising a casing, means carried thereby having two circumferentially spaced sets of circumferentially spaced graduations thereon, a swinging pointer co-operating successively with said graduations, a receptacle of fixed volume adapted to receive the material to be tested and means in said casing carrying said receptacle and operated thereby, said means being connected to said pointer so as to move the same, whereby said pointer co-operates with one set of the graduations when the said receptacle is filled with liquid material and co-operates with the other set of graduations when said receptacle is filled with material frozen from said liquid.

2. A device of the class described, comprising a casing, a dial thereon having two circumferentially spaced similarly designated sets of circumferentially spaced graduations thereon, an oscillating pointer adapted to co-operate with both sets of graduations, a lever mounted in said casing and connected to said pointer for moving the same, and means for holding a fixed volume of ice cream mixture suspended from said lever, said parts being so arranged that when said means is filled with liquid material, said pointer co-operates with one set of graduations and when said means is filled with material frozen from said liquid, said pointer is moved and co-operates with the other set of graduations.

3. A device of the class described, comprising a casing, a dial carried thereby having two circumferentially spaced sets of circumferentially arranged graduations thereon, a lever mounted in said casing, an oscillating pointer carried by said lever and adapted to be moved to co-operate with both sets of said graduations, an arm projecting from said lever, a weight adjustably secured to said arm, means swingingly depending from said lever, and a receptacle suspended by said means adapted to receive material, said parts being so arranged that when said receptacle is filled with liquid, said pointer co-operates with one set of graduations and when said receptacle is filled with material frozen from said liquid, said pointer co-operates with the other set of graduations.

4. A device of the class described comprising a dial, having a plurality of sets of circumferentially spaced and similarly designated graduations thereon, a swinging pointer co-operating with said graduations, swinging means connected with said pointer, and a receptacle suspended from said swinging means adapted to receive the ice cream mixture, said pointer co-operating with a graduation in one of said sets when said receptacle receives the liquid mixture to indicate the weight thereof and co-operating with a similarly designated graduation of the other set of graduations when said receptacle contains the frozen material expanded to the desired degree.

5. An ice cream overrun tester comprising, a casing, a dial thereon having two circumferentially arranged spaced sets of graduations, a weighted lever mounted in said casing, a pointer carried by said lever to swing about an axis disposed centrally of said dial, a member depending from said lever, a receptacle carried by said member adapted to receive the ice cream mixture, and the frozen or partially frozen ice cream, one set of said graduations being adapted to co-operate with said pointer when the liquid ice cream mixture is placed in the receptacle and the other set being adapted to co-operate with the pointer when the frozen or partially frozen ice cream is placed in the receptacle.

6. A device of the class described comprising a cylindrical casing, a dial carried thereby having two sets of graduations thereon, a pointer co-operating with said graduations, a bracket having spaced lugs mounted in said casing, a lever having sharp edged projections at each side supported on said lugs, means forming a stop for said lever, a plurality of arms projecting from one end of said lever, adjustable weights on said arms, said lever having sharp edged projections at each side adjacent its other end, a yoke having apertured lugs supported on said last mentioned projections, a link depending from said yoke and extending through the bottom of said casing, a receptacle adapted to hold the fixed volume of material carried by said link, and a retarding means connected to said lever above the first mentioned end thereof.

In testimony whereof I affix my signature.

WILLIAM J. McLAUGHLIN.